Sept. 4, 1934. C. H. HAPGOOD 1,972,144
MILKING MACHINE PAIL ADAPTED TO RECEIVE AND DISCHARGE MILK
Filed Feb. 11, 1931

WITNESS:
Robt P Kitchel

INVENTOR
Cyrus Howard Hapgood
BY
Busser and Harding
ATTORNEYS.

Patented Sept. 4, 1934

1,972,144

UNITED STATES PATENT OFFICE 1,972,144

MILKING MACHINE PAIL ADAPTED TO RECEIVE AND DISCHARGE MILK

Cyrus Howard Hapgood, Nutley, N. J., assignor to The De Laval Separator Company, New York, N. Y., a corporation of New Jersey Application February 11, 1931, Serial No. 514,961

2 Claims. (Cl. 31—82)

A milking machine forming the subject matter of an application filed by me February 2, 1929, Serial No. 336,998, comprises teat cups, an ultimate milk receiver, and a main control valve which is movable into one position to connect a milk pail or can with the teat cups and with a source of vacuum, into another position to connect the milk pail or can with a source of pressure (atmosphere) and the ultimate milk receiver, and into a third position to disrupt all of said connections; the pail or can being provided with a special valve-controlled outlet through which, when the valve is in the third position, a small quantity of milk may be discharged into any suitable receptacle, so that the milk of any individual cow may be tested. In the last named position, a special air inlet valve may be provided to assist the expulsion of milk, although this is unnecessary, since the opening of the special milk outlet will allow air to bubble up through the milk and relieve the vacuum.

The present invention relates to the construction of the can or pail. It is desirable to provide a pail having a transparent wall in order that the milk can be examined during its inflow into the can. The necessity, however, of providing at the top an inlet and an outlet for air and an inlet for milk and of providing means for discharging the milk from the bottom, necessitate the provision of a metal head and a metal bottom and the clamping of a glass cylinder between them. One of the objects of the present invention is to provide a special vacuum chamber at the top of the pail and means to maintain such vacuum chamber in air-tight relation with the pail cover and to maintain the pail cover in air-tight relation with the pail body.

A difficulty that has been experienced with the above described milking machine is that when the pail is connected at the bottom with the milk discharge main leading to the ultimate receiver and at the top with atmosphere, the air, as soon as the milk is exhausted from the pail, will follow the outflow of milk and enter the discharge main and the ultimate receiver. Another of the objects of the present invention is to prevent this outrush of air behind the milk.

In the drawing, which shows a preferred embodiment of the invention—

Figure 1:
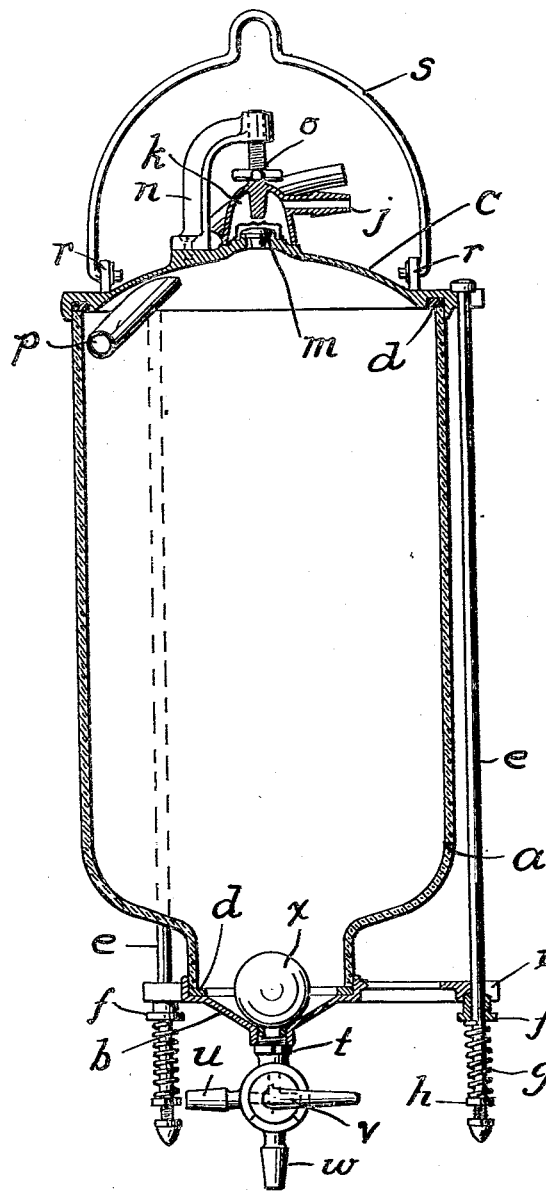
Fig. 1 is a vertical sectional view of the improved pail.
Figure 2:
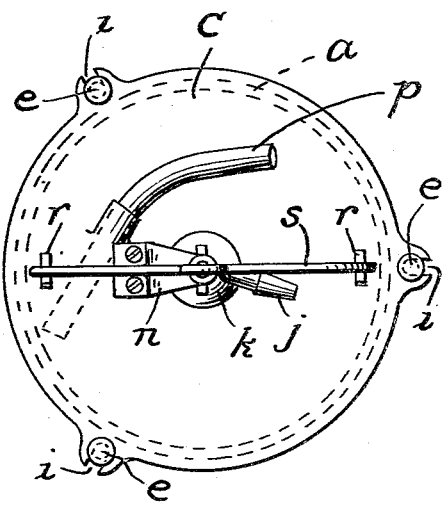
Fig. 2 is a plan view.

The pail comprises a glass body $a$ open at top and bottom and clamped between a conical metal bottom plate $b$ and a metal cover member $c$. Between the upper circumferential edge of the glass body $a$ and the cover plate $c$ and between the lower circumferential edge of the glass body $a$ and the bottom plate $b$ are rubber gaskets $d$.

Bottom plate $b$ and cover plate $c$ are each provided with flanges, through which extend tie rods $e$. The upper end of each tie rod is provided with a head which rests on the flange of the cover member $c$. The lower end of each tie rod extends a substantial distance below the flange of the bottom plate. A thimble $f$ is sleeved on the tie rod and extends into a recess on the bottom face of the last named flange. A coil spring $g$ surrounds the tie rod and is confined between thimble $f$ and a nut $h$ on the tie rod.

With the tension of the spring properly adjusted by the nut $h$, the glass body may be securely clamped between the metal top and bottom members. Any unequal contraction or expansion of the tie rods and the glass body will be compensated for by the expansion or compression of the springs $g$, thereby insuring the glass body against cracking or breakage.

The flanges of the top and bottom members, either or both, may be provided with marginally open slots $i$ into which the tie rods may be entered laterally when the parts are assembled and removed in the opposite directions when the parts are disassembled.

The cover plate $c$ is provided with a central orifice communicating with a vacuum chamber formed, preferably, by a separate cup-shaped casing $k$ resting on the top of the cover and having a nipple $j$ adapted for connection with a source of vacuum. A double check valve $m$ of known type is adapted to prevent any back flow of air through the vacuum chamber into the pail. On the cover plate is a bracket $n$ into whose overhanging end is threaded a screw $o$ whose head overlies the top of the casing $k$. When the parts are assembled the screw is turned to cause its head to press against the casing $k$ and hold the casing in air tight contact with the cover plate.

A milk pipe $p$, adapted for connection with the teat cups (not shown), is carried by the cover plate and extends into the upper part of the interior of the pail in a substantially tangential direction.

To ears $r$ on the cover member $c$ are secured the ends of a bail $s$, by means of which the pail may be suspended from scales (not shown).

The conical bottom $b$ is provided with a nozzle $t$ through which milk may be conveyed, through a nipple $u$ and through conduits not shown, to a milk discharge main and receiving tank (not shown).

In normal operation, a main control valve (not shown) as described in my prior application, is movable into one position to connect the pail, through vacuum chamber $k$, with vacuum, and the milk pipe $p$ with the teat cups, this being the milking position during which the milk from a cow enters the pail; and is movable into another position to cut off said connections and connect pipe $p$ with atmosphere and open the connection between nozzle $t$ and nipple $u$ and the milk discharge conduits, this being the position during which milk is discharged from the pail. It will be observed that the milk pipe $p$ is arranged approximately tangentially to the wall of the pail. This is of decided advantage in that it allows the air to escape from the incoming milk and thereby reduces the objectionable milk foam.

The main control valve is movable into a third position to cut off all these connections.

Nozzle $t$ may be provided with a branch nipple $w$ and with a three-way cock $v$ which, in the milk inflow and milk discharge positions, connects nozzle $t$ and nipple $u$, but which is movable, in the described third position of the main control valve, to connect nozzle $t$ with nipple $w$, thereby allowing a small quantity of milk to be discharged, for testing, into any suitable portable receptacle.

If a visual inspection of the milk in the glass pail should show that it is contaminated and not in condition to be transferred to the receiver, while nozzle $t$ is connected with nipple $w$, the main control valve can be put in the position to admit air through pipe $p$, which will allow the entire contents of the pail to be discharged into a suitable receptacle.

This operation may be performed at intervals and the collected milk weighed on tested scales to check the accuracy of the scales from which the pails are suspended.

In the operation of the milking machine of my prior application, air is admitted to the pail, as heretofore described, to effect the discharge of the milk. When the discharge of milk is completed, the air in the pail flows out into the milk discharge line and mixes with the milk until the main control valve is shifted into position to connect the pail with vacuum. Not only does the air mix with the milk, but the vacuum is broken to such an extent that other pails will not discharge the milk when the control valve is set in the discharge position and if this condition continues for but a comparatively short time the whole milking operation will stop. I have succeeded in preventing this outflow of air by placing in the pail a ball float, preferably a hollow aluminum ball $x$, which floats on the milk and which, when the milk is exhausted from the pail, settles over the milk outlet at the apex of the conical bottom plate $b$ and seals the outlet against discharge of air. The inside surface of the conical bottom and the surface of the ball should not both be so smooth as to afford a quite perfect closure, since a slight leak is desirable to remove the milk foam from the pail and a small amount of air leaking into the milk discharge conduits serves to drive any remaining milk into the receiver. A slight roughness or irregularity of the surface of the ball or seat allows sufficient leakage.

Having now fully described my invention, what I claim and desire to protect by Letters Patent is:

1. A milk pail adapted to receive milk from teat cups and discharge it into a receiver and comprising a glass body, a metal bottom plate, a metal cover plate provided with a central opening, an open-bottomed casing, providing a vacuum chamber, above and seated upon the cover plate over said opening, a check valve at said opening, a bracket carried by the cover plate and overhanging the opening, and adjustable means between the bracket and the casing adapted to hold said casing tightly against said cover plate.

2. A pail for receiving and accumulating milk and having means at the top to alternately admit milk and air and an opening at the bottom, a milk discharge pipe communicating with said opening and adapted to be alternately connected with and disconnected from suction, valve-controlled means connecting the top of the pail with a source of vacuum, a ball adapted to float on the milk when said discharge pipe is disconnected from suction and while the top of the pail is connected with vacuum and while milk is being admitted to said pail and also while the top of the pail is closed to vacuum and while said discharge pipe is connected with suction and while milk is being discharged from the pail, said ball being adapted, only when the discharge of milk is about completed, to seat upon and approximately close the bottom opening to prevent an objectionable outflow of air following the milk into the discharge pipe and means to prevent a perfect closure of the bottom opening by the ball valve and allow a slight leakage of air into the milk discharge pipe to drive the milk through the pipe.

CYRUS HOWARD HAPGOOD.